(12) United States Patent
Park et al.

(10) Patent No.: US 11,204,494 B2
(45) Date of Patent: Dec. 21, 2021

(54) FOCAL VARIABLE DEVICE SYSTEM

(71) Applicant: ELECTRONICS AND TELECOMMUNICATIONS RESEARCH INSTITUTE, Daejeon (KR)

(72) Inventors: Suntak Park, Daejeon (KR); Bong Je Park, Daejeon (KR); Seung Koo Park, Sejong (KR); Jae Woong Yoon, Yongin (KR); Eun Jin Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 140 days.

(21) Appl. No.: 16/721,709

(22) Filed: Dec. 19, 2019

(65) Prior Publication Data
US 2020/0209613 A1 Jul. 2, 2020

(30) Foreign Application Priority Data
Dec. 26, 2018 (KR) .......................... 10-2018-0169953

(51) Int. Cl.
*G02B 7/04* (2021.01)
*G02B 26/08* (2006.01)
*G02B 26/00* (2006.01)

(52) U.S. Cl.
CPC .......... *G02B 26/0825* (2013.01); *G02B 7/04* (2013.01); *G02B 26/004* (2013.01); *G02B 26/0875* (2013.01)

(58) Field of Classification Search
CPC .............. G02B 26/0825; G02B 26/004; G02B 26/0875; G02B 7/04; G02B 5/005; G02B 3/0006; G02B 26/0816; G02B 7/008; G02B 7/028; G02B 26/0866
See application file for complete search history.

(56) References Cited

U.S. PATENT DOCUMENTS

| | | | | |
|---|---|---|---|---|
| 6,999,221 | B1 * | 2/2006 | Sarkisov | ................. H01L 41/08 359/244 |
| 2015/0234153 | A1 | 8/2015 | Park et al. | |
| 2017/0054929 | A1 | 2/2017 | Park et al. | |

FOREIGN PATENT DOCUMENTS

| | | |
|---|---|---|
| JP | 2006047484 A | 2/2006 |
| KR | 100234236 B1 | 12/1999 |
| KR | 20150098188 A | 8/2015 |

* cited by examiner

Primary Examiner — Joseph P Martinez

(57) ABSTRACT

Provided is focal variable device system including a focus variable element including an absorbing layer, and an adjustable light source configured to cause an adjustable light to enter the focus variable element. The absorbing layer includes a thermal expansion material that absorbs the adjustable light and thermally expands.

15 Claims, 10 Drawing Sheets

FOCAL VARIABLE DEVICE SYSTEM

CROSS-REFERENCE TO RELATED APPLICATIONS

This U.S. non-provisional patent application claims priority under 35 U.S.C. § 119 of Korean Patent Application No. 10-2018-0169953, filed on Dec. 26, 2018, the entire contents of which are hereby incorporated by reference.

BACKGROUND

The present disclosure herein relates to a focal variable device system, and more particularly, to a focal variable device system that absorbs light and thermally expands.

Recently, with the development of display technology such as camera, portable terminal, projector, TV based on digital technology, miniaturization of high resolution screens and related optical systems is required. In addition, the miniaturization and convenience of the optical lens system for acquiring a high quality image is emphasized, and researches for this are being actively conducted.

In particular, as a high-definition image sensor is mounted on a camera module mounted on a portable terminal, functions such as variable focus and optical zoom and miniaturization are becoming more important. Currently, actuators are mostly used to implement variable focus and optical zoom in mobile phone camera modules. The auto zoom actuator adjusts the position of the lens to focus automatically. It mainly uses voice coil motor (VCM) and piezo. The VCM method is driven by the current flowing through the coil and the electromagnetic force by the magnet, and has a limitation in electromagnetic wave generation and precision. The piezo method is driven by friction between the stator and the rotor seat, and has a short life due to abrasion and a high price. Furthermore, a method for optical zoom function uses a step motor. Since this method moves the driving part linearly by rotating the lead screw with the rotary motion driver, there are disadvantages such as complicated mechanisms, friction of gear parts, and noise.

In addition, the conventional technique of the reflective focus variable lens mostly uses the pressure of the gas or fluid or the electromagnetic force. Since technology that uses gas or fluid pressure requires additional pressure regulators, it is very difficult to miniaturize or array, and the manufacturing process and structure is complicated, so the manufacturing cost is high.

Another technique is to use an electroactive polymer material and there is a technology for implementing a variable mirror or variable lens function by using a structure that changes the shape when an electric field is applied. This technique has a simple driving structure but requires a driving unit to which an electric field is applied.

As such, most existing technologies are difficult to manufacture at low cost or difficult to miniaturize due to their complex structure. Also, since all technologies have physical structures or use electrical effects, they need a transparent electrode. As a result, an electrical driver is required and light transmission is deteriorated.

SUMMARY

The present disclosure provides a simple and reliable focal variable device system.

An embodiment of the inventive concept provides a focal variable device system including: a focus variable element including an absorbing layer; and an adjustable light source configured to cause an adjustable light to enter the focus variable element, wherein the absorbing layer includes a thermal expansion material that absorbs the adjustable light and thermally expands.

In an embodiment, the focus variable element may further include a reflective layer, wherein the absorbing layer may have a first thermal expansion coefficient, wherein the reflective layer may have a second thermal expansion coefficient different from the first thermal expansion coefficient.

In an embodiment, the focus variable element may further include a reflective layer, wherein the absorbing layer may have a first absorption rate for the adjustable light, wherein the reflective layer may have a second absorption rate that is different from the first absorption rate for the adjustable light.

In an embodiment, the first thermal expansion coefficient may be greater than the second thermal expansion coefficient.

In an embodiment, the first absorption rate may be greater than the second absorption rate.

In an embodiment, a thickness of the absorbing layer may be thicker than a thickness of the reflective layer.

In an embodiment, the focal variable device system may further include a middle layer disposed between the absorbing layer and the reflective layer.

In an embodiment, the middle layer may have a third thermal expansion coefficient that is greater than the first thermal expansion coefficient.

In an embodiment, the middle layer may have a third thermal expansion coefficient, wherein the third thermal expansion coefficient may be less than the first thermal expansion coefficient and greater than the second thermal expansion coefficient.

In an embodiment, the focus variable element may further include: a lens part; a middle layer between the absorbing layer and the lens part; and a supporting part configured to accommodate the absorbing layer, the middle layer, the lens part.

In an embodiment, the first thermal expansion coefficient may be 10 times or more than the second thermal expansion coefficient.

In an embodiment, the absorbing layer may include a polymer, wherein the reflective layer may include a metal, a dielectric material, and/or a polymer.

In an embodiment, the absorbing layer may include at least one of polyamide, polyester, polysiloxane, polyurethane, polyimide, polyether, polycarbonate, or acrylic polymer.

In an embodiment, the absorbing layer may include an absorbing pattern having a diameter which is equal to or smaller than a wavelength of the adjustable light.

In an embodiment of the inventive concept, a focal variable device system includes: a focus variable element including an absorbing layer with a thermal expansion material; and an adjustable light source unit configured to cause an adjustable light that adjusts a thermal expansion of the absorbing layer to enter the focus variable element, wherein the adjustable light source unit includes: a first adjustable light source configured to cause a first adjustable light to enter the focus variable element; and a second adjustable light source configured to cause a second adjustable light to enter the focus variable element.

In an embodiment, the focal variable device system may further include a controller for controlling the adjustable light source unit, wherein the first adjustable light source may cause the first adjustable light to enter a first position of the focus variable element, wherein the second adjustable light source may cause the second adjustable light to enter a second position of the focus variable element, wherein the controller may control the first adjustable light source and the second adjustable light source to adjust an intensity of the first adjustable light and the second adjustable light.

In an embodiment, the focal variable device system may further include a controller for controlling the adjustable light source unit, wherein the first adjustable light source may cause the first adjustable light to enter a first position of the focus variable element, wherein the second adjustable light source may cause the second adjustable light to enter a second position of the focus variable element, wherein the controller may control the first adjustable light source and the second adjustable light source to adjust a shape of the first adjustable light and the second adjustable light.

In an embodiment, the focus variable element may further include a reflective layer, wherein the absorbing layer may have a first thermal expansion coefficient, wherein the reflective layer may have a second thermal expansion coefficient that is less than the first thermal expansion coefficient.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1A:
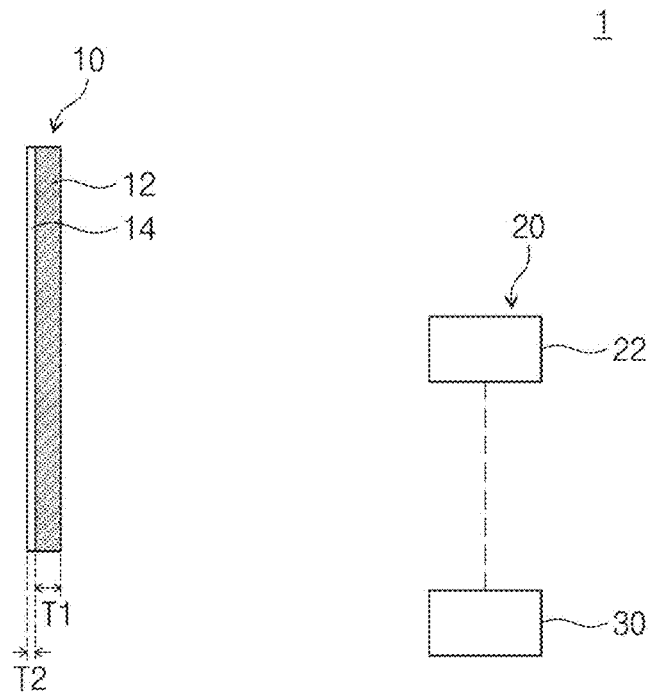
FIG. 1A is a view showing a focal variable device system according to an embodiment of the inventive concept.

Advantages and features of the inventive concept, and implementation methods thereof will be clarified through following embodiments described with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Further, the inventive concept is only defined by scopes of claims. Like reference numbers refer to like elements throughout the entire specification.

The terms used in this specification are used only for explaining specific embodiments while not limiting the inventive concept. The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or components.

Additionally, embodiments described in this specification will be described with plan views sectional views, that is, ideal exemplary views of the inventive concept. In the drawings, the thicknesses of a layer and an area are exaggerated for effective description. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limited to the scope of the inventive concept.

Figure 1B:
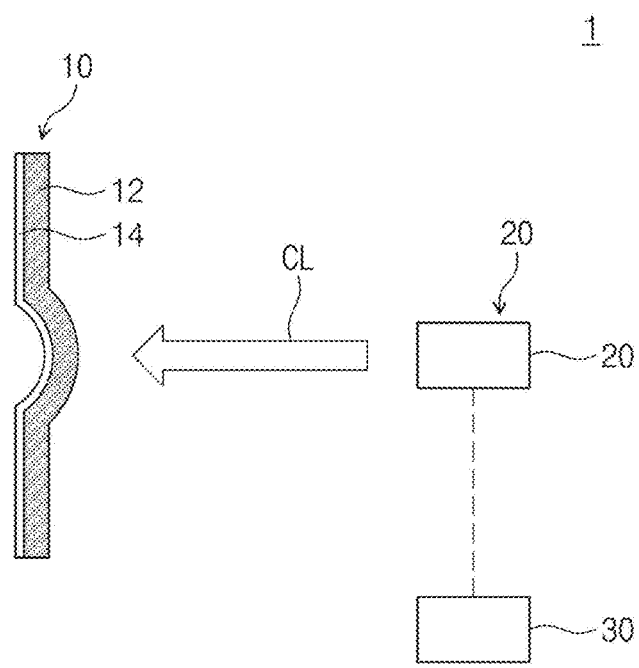
FIGS. 1B and 1C are views showing a process of operating the focal variable device system of FIG. 1A.
Figure 1C:
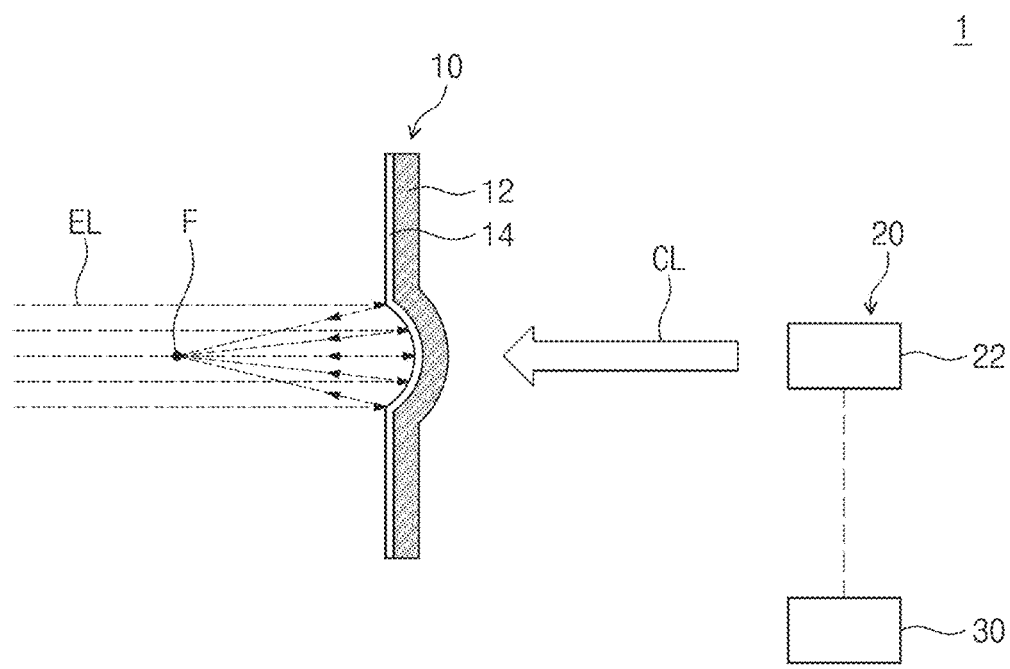

FIG. 1A is a view showing a focal variable device system 1 according to an embodiment of the inventive concept. FIGS. 1B and 1C are views showing a process of operating the focal variable device system 1 of FIG. 1A. Hereinafter, the focal variable device system 1 according to an embodiment of the inventive concept will be described with reference to FIGS. 1A to 1C.

Referring to FIGS. 1A to 1C, the focal variable device system 1 may include a focus variable element 10, an adjustable light source unit 20, and a controller 30. The focus variable element 10 may be a focus variable mirror. The focus variable element 10 may include an absorbing layer 12 and a reflective layer 14. The absorbing layer 12 may have a first thickness T1, and the reflective layer 14 may have a second thickness T2 smaller than the first thickness T1.

The absorbing layer 12 absorbs the adjustable light CL emitted from the adjustable light source 22, and may change its shape. For example, the absorbing layer 12 may be thermally expanded and changed in shape by heat generated by absorbing the adjustable light CL. The reflective layer 14 may reflect the incident external light EL to focus on the focal point F. The reflective layer 14 absorbs the adjustable light CL emitted by the adjustable light source 22 and may change its shape. The focal point F may vary depending on the intensity of the adjustable light CL, and the shape of the absorbing layer 12 and the reflective layer 14. In the present specification, for simplicity of description, the adjustable light CL of the adjustable light source 22 for varying the focal point of the focus variable element 10 is shown in solid lines, and the external light EL incident on the focus variable element 10 is shown in dashed lines.

The absorbing layer 12 may comprise a thermal expansion material having a first coefficient of thermal expansion. The absorbing layer 12 may include a polymer. For example, the absorbing layer 12 may include at least one of polyamide, polyester, polysiloxane, polyurethane, polyimide, polyether, polycarbonate, or acrylate polymer. The absorbing layer 12 may include an absorbing pattern 12a for facilitating absorption of the adjustable light CL.

Figure 1D:
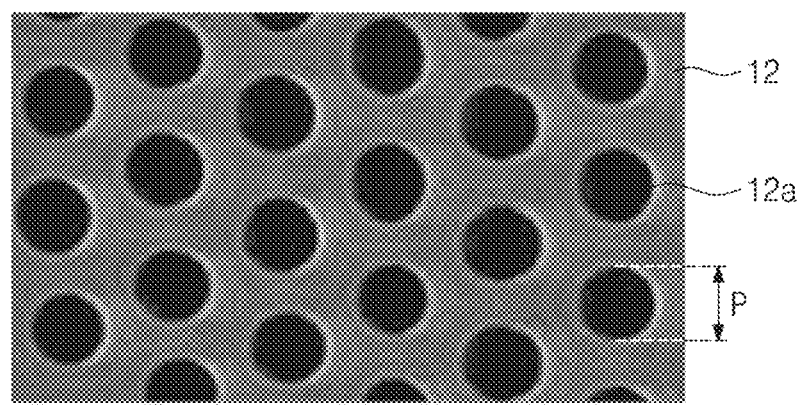
FIG. 1D is a view showing an example of an absorbing pattern.

FIG. 1D is a view showing an example of the absorbing layer 12 having the absorbing pattern 12a. The absorbing layer 12 may include the absorbing pattern 12a. For example, circular patterns having a diameter P may be repeatedly provided in the absorbing pattern 12a. The diameter P of the absorbing pattern 12a may be equal to or smaller than the wavelength of the adjustable light CL. For example, when the adjustable light CL is visible light, the diameter P may be provided in several to several hundred nm. The plasmon effect of the absorbing pattern 12a (the plasmon bound to the metal strongly interacts with light) can amplify the absorption of the adjustable light CL. FIG. 1D is only one example of the absorbing pattern 12a. Unlike this, the absorbing pattern 12a may have various structures such as a pillar shape and a grid shape.

Referring to FIGS. 1A to 1C again, the reflective layer 14 may include a thermal expansion material having a second coefficient of thermal expansion. The reflective layer 14 may include metals, dielectrics, and/or polymers. The second thermal expansion coefficient may be smaller than the first thermal expansion coefficient. The first thermal expansion coefficient may be about 10 times larger than the second thermal expansion coefficient (at room temperature). For example, the absorbing layer 12 includes PDMS, and the reflective layer 14 includes gold (Au). In this case, the first thermal expansion coefficient may be $3 \times 10^{-4}$, and the second thermal expansion coefficient may be $1.42 \times 10^{-5}$.

Since the first thermal expansion coefficient of the absorbing layer 12 is greater than the second thermal expansion coefficient of the reflective layer 14, the curvature change rate of the absorbing layer 12 may be greater than the curvature change rate of the reflective layer 14. Since thermal expansion coefficients of the absorbing layer 12 and the reflective layer 14 are different, curvature change rates of the absorbing layer 12 and the reflective layer 14 may be different. For example, since the curvature change rate of the absorbing layer 12 is greater than the curvature change rate of the reflective layer 14, the absorbing layer 12 is expanded than the reflective layer 14 so that the absorbing layer 12 may be convex based on the direction toward the adjustable light source 20 in the plane (for example, the plane on which the absorbing layer is placed before the adjustable light is applied) of the absorbing layer 12.

The absorbing layer 12 may have a first absorption rate for the adjustable light CL, and the reflective layer 14 may have a second absorption rate for the adjustable light CL. The first absorption rate may be higher than the second absorption rate. Accordingly, since the adjustable light CL absorption amount of the absorbing layer 12 is greater than the adjustable light absorption amount of the reflective layer 14, the curvature change rate of the absorbing layer 12 may be greater than the curvature change rate of the reflective layer 14. For example, since the curvature change rate of the absorbing layer 12 is greater than the curvature change rate of the reflective layer 14, the absorbing layer 12 is expanded than the reflective layer 14 so that the absorbing layer 12 may be convex compared to the plane (for example, the plane on which the absorbing layer is placed before the adjustable light is applied) of the absorbing layer 12.

In the drawings, the absorbing layer 12 and the reflective layer 14 are provided as a single layer, for example. However, the absorbing layer 12 and/or the reflective layer 14 may be provided in a multilayer structure.

The adjustable light source 20 may include an adjustable light source 22. The adjustable light source 22 may cause the adjustable light CL to enter the focus variable element 10. The adjustable light source 22 may be, for example, a pulse laser.

The controller 30 may control the adjustable light source 22. For example, the adjustable light source 22 may control the adjustable light source 22 to adjust the intensity and/or shape of the adjustable light CL emitted to the focus variable element 10. The focus variable element 10 may have a large curvature change rate in proportion to the intensity of the adjustable light CL and may have a shape corresponding to the shape of the adjustable light CL. Accordingly, the focus variable element 10 may change the focal point according to the adjustable light CL.

Referring to FIGS. 1B and 1C, when the adjustable light source 22 causes the adjustable light CL to enter the focus variable element 10, the shape of the focus variable element 10 may change in correspondence to the intensity and/or shape of the adjustable light CL. For example, since the curvature change rate of the absorbing layer 12 is greater than the curvature change rate of the reflective layer 14, the absorbing layer 12 is expanded than the reflective layer 14 so that the absorbing layer 12 may be convex in the direction toward the adjustable light source 20 in the plane (for example, the plane on which the absorbing layer is placed before the adjustable light is applied) of the absorbing layer 12. The external light EL may be reflected by the focus variable element 10 having a variable shape and may be focused at the focal point F. In other words, the focus variable element 10 may function as a focus variable mirror.

According to an embodiment of the invention, the focus variable element 10 of the focal variable device system 1 absorbs light and thermally expands so that the shape may vary. The focal variable device system 1 according to the inventive concept may not require a separate physical and/or electrical driver (e.g., actuator, VCM, piezo, etc.). Accordingly, the focal variable device system 1 of a simpler structure can be implemented, remote driving can be possible, and various types of focal variable device system 1 can be implemented.

Figure 2A:
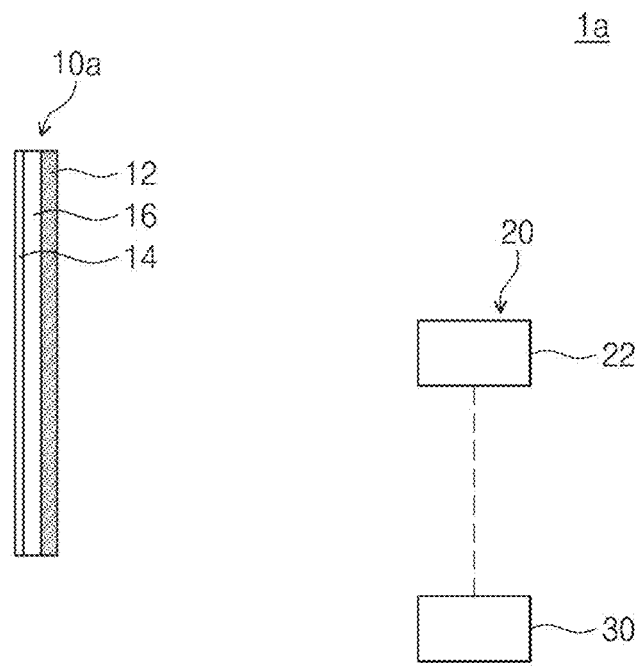
FIG. 2A is a view showing a focal variable device system according to an embodiment of the inventive concept.
Figure 2B:
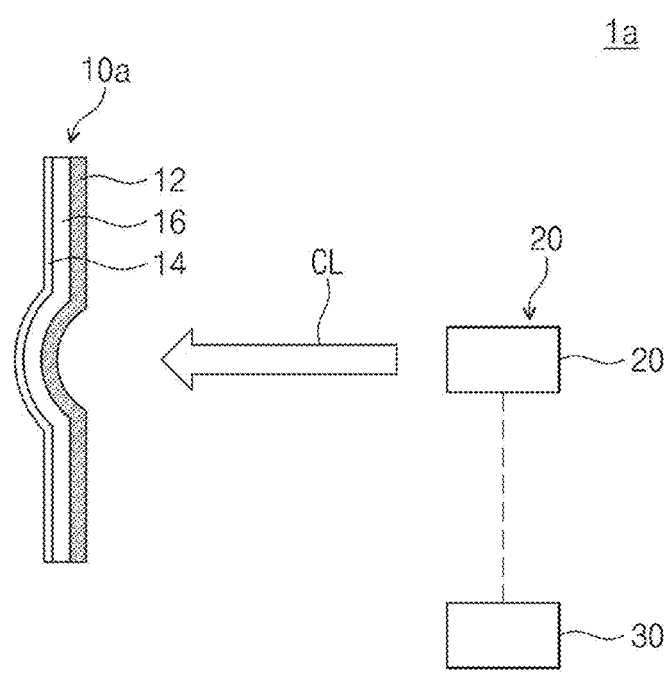
FIGS. 2B and 2C are views showing a process of operating the focal variable device system of FIG. 2A.
Figure 2C:
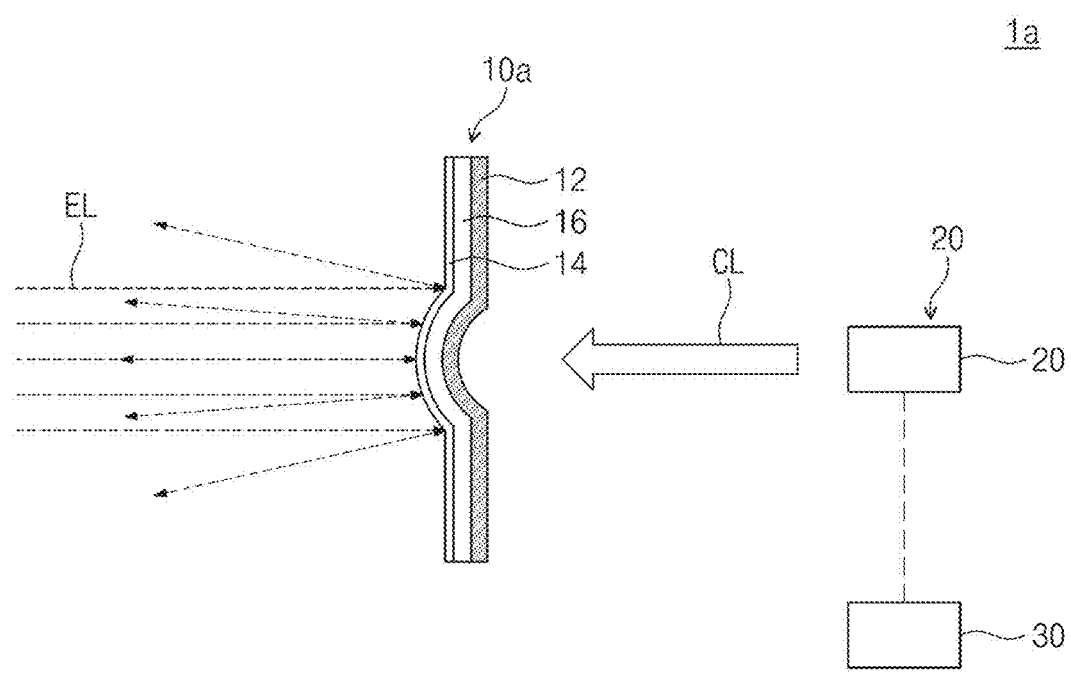

FIG. 2A is a view showing a focal variable device system 1a according to an embodiment of the inventive concept. FIGS. 2B and 2C are views showing a process of operating the focal variable device system 1a of FIG. 2A. Hereinafter, the focal variable device system 1a according to an embodiment of the inventive concept will be described with reference to FIGS. 2A to 2C. Configurations that are substantially the same as or similar to those of the focal variable device system 1 described above with reference to FIGS. 1A to 1C are denoted by the same reference numerals, and redundant description thereof will be omitted.

The focus variable device system 1a of FIG. 2A may further include a middle layer 16. The middle layer 16 may be disposed between the absorbing layer 12 and the reflective layer 14. The middle layer 16 may be thermally expanded and changed in shape by heat generated by absorbing the adjustable light CL. The middle layer 16 may have a third thermal expansion coefficient. The third thermal expansion coefficient may be less than the first thermal expansion coefficient and greater than the second thermal expansion coefficient. The middle layer 16 may serve as a buffer according to the curvature change rate difference between the reflective layer 14 and the absorbing layer 12. Unlike this, the third thermal expansion coefficient of the middle layer 16 may be greater than the first thermal expansion coefficient. FIGS. 2B and 2C illustrate an example in which the third thermal expansion coefficient is larger than the first thermal expansion coefficient.

Referring to FIGS. 2B and 2C, when the adjustable light source 22 causes the adjustable light CL to enter the focus variable element 10a, the shape of the focus variable element 10a may change in correspondence to the intensity and/or shape of the adjustable light CL. Since the third thermal expansion coefficient of the middle layer 16 is greater than the first thermal expansion coefficient of the absorbing layer 12, the curvature change rate of the middle layer 16 may be greater than the curvature change rate of the absorbing layer 12. As shown in FIG. 2B, since the curvature change rate of the middle layer 16 is greater than the curvature change rate of the absorbing layer 12, the middle layer 16 is expanded than the absorbing layer 12 so that the absorbing layer 12 may be concave based on the direction toward the adjustable light source 20 in the plane (for example, the plane on which the absorbing layer is placed before the adjustable light is applied) of the absorbing layer 12. The external light EL may be reflected by the focus variable element 10a having a variable shape and the focus variable element 10a may function as a convex mirror.

Figure 3A:
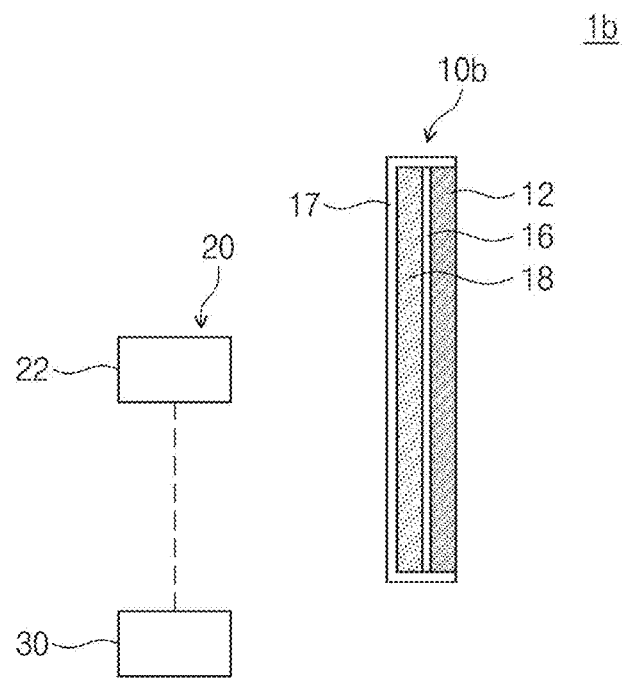
FIG. 3A is a view showing a focal variable device system according to an embodiment of the inventive concept.
Figure 3B:
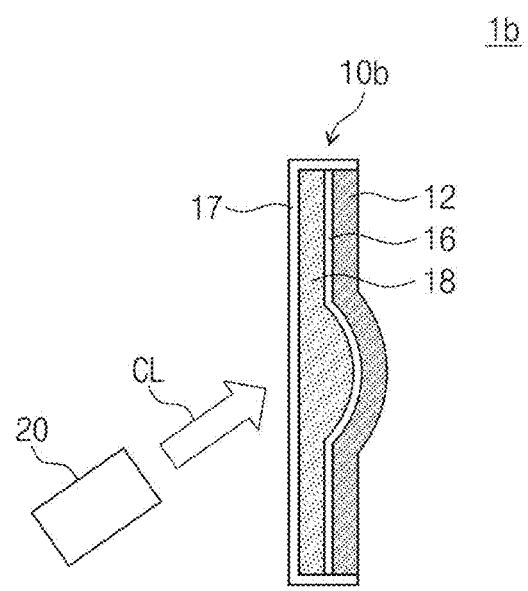
FIGS. 3B and 3C are views showing a process of operating the focal variable device system of FIG. 3A.
Figure 3C:
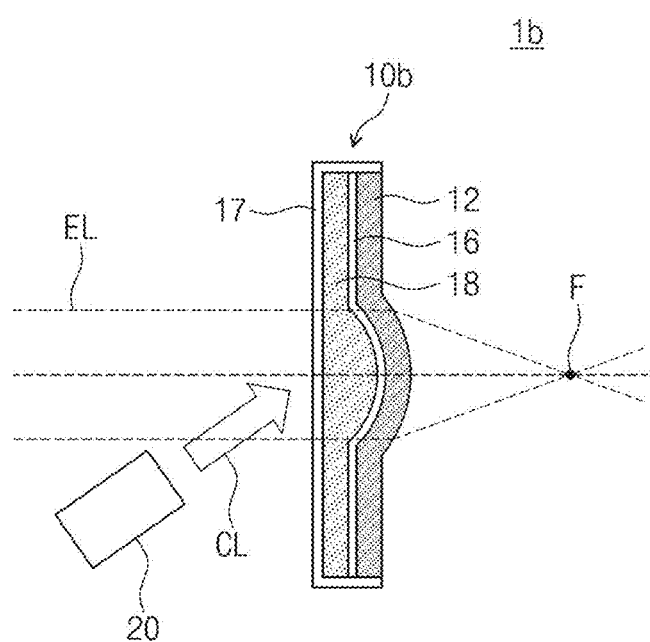

FIG. 3A is a view showing a focal variable device system 1b according to an embodiment of the inventive concept. FIGS. 3B and 3C are views showing a process of operating the focal variable device system 1b of FIG. 3A. Hereinafter, the focal variable device system 1b according to an embodiment of the inventive concept will be described with reference to FIGS. 3A to 3C. Configurations that are substantially the same as or similar to those of the focal variable device system 1 described above with reference to FIGS. 1A to 1C are denoted by the same reference numerals, and redundant description thereof will be omitted.

The focus variable device system 1b of FIG. 3A may include an absorbing layer 12, a middle layer 16, a support 17, and a lens part 18. The lens part 18 may include a lens material. The lens part 18 may be provided, for example, in the form of a liquid or a gel. The middle layer 16 may be disposed between the absorbing layer 12 and the lens part 18. The middle layer 16 may be thermally expanded and changed in shape by heat generated by absorbing the adjustable light CL. The middle layer 16 may have a third thermal expansion coefficient. The third thermal expansion coefficient may be larger or smaller than the first thermal expansion coefficient. As described above, according to the difference between the first thermal expansion coefficient and the third thermal expansion coefficient, the focus variable element 10b may function as a convex lens or a concave lens. FIGS. 3B and 3C illustrate an example in which the third thermal expansion coefficient is smaller than the first thermal expansion coefficient. The support 17 may receive an absorbing layer 12, a middle layer 16, and a lens part 18. The support 17 may include a transparent material.

Referring to FIGS. 3B and 3C, when the adjustable light source 22 causes the adjustable light CL to enter the focus variable element 10b, the shape of the focus variable element 10b may change in correspondence to the intensity and/or shape of the adjustable light CL. Since the first thermal expansion coefficient of the absorbing layer 12 is greater than the third thermal expansion coefficient of the middle layer 16, the curvature change rate of the absorbing layer 12 may be greater than the curvature change rate of the middle layer 16. As shown in FIG. 3B, since the curvature change rate of the absorbing layer 12 is greater than the curvature change rate of the middle layer 16, the absorbing layer 12 is expanded than the middle layer 16 so that the absorbing layer 12 may be convex based on the direction toward the adjustable light source 22 in the plane (for example, the plane on which the absorbing layer is placed before the adjustable light is applied) of the absorbing layer 12. The external light EL may be transmitted through the focus variable element 10b having a variable shape and be focused at the focal point F. In other words, the focus variable element 10b may function as a convex lens.

Figure 4A:
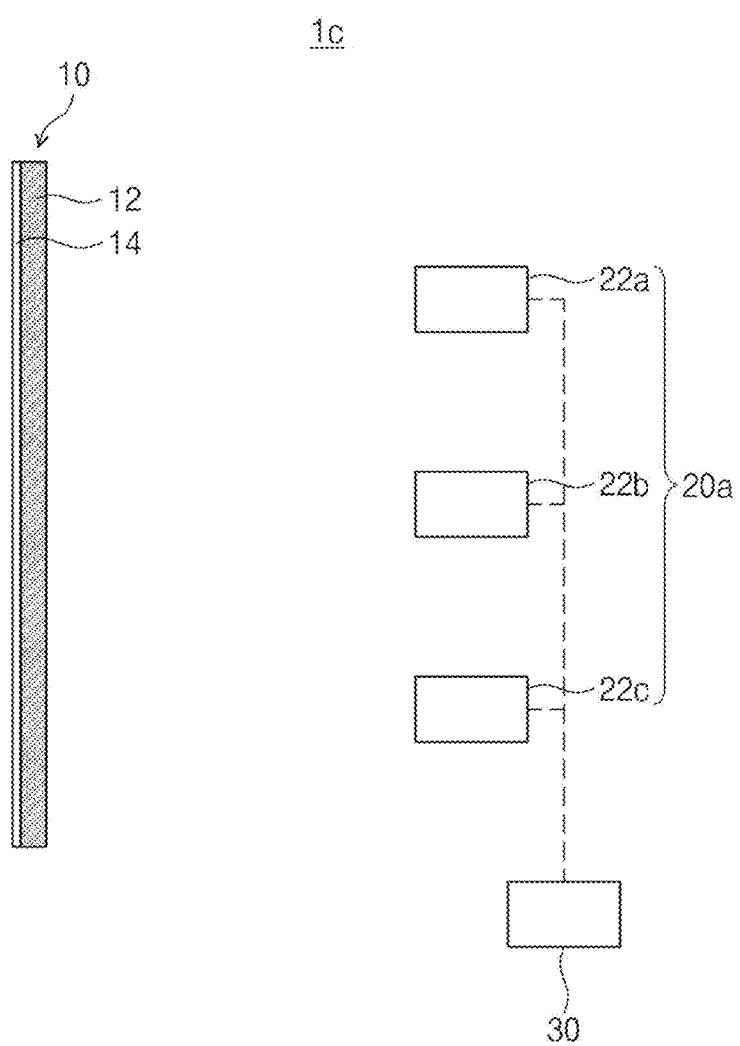
FIG. 4A is a view showing a focal variable device system according to an embodiment of the inventive concept.
Figure 4B:
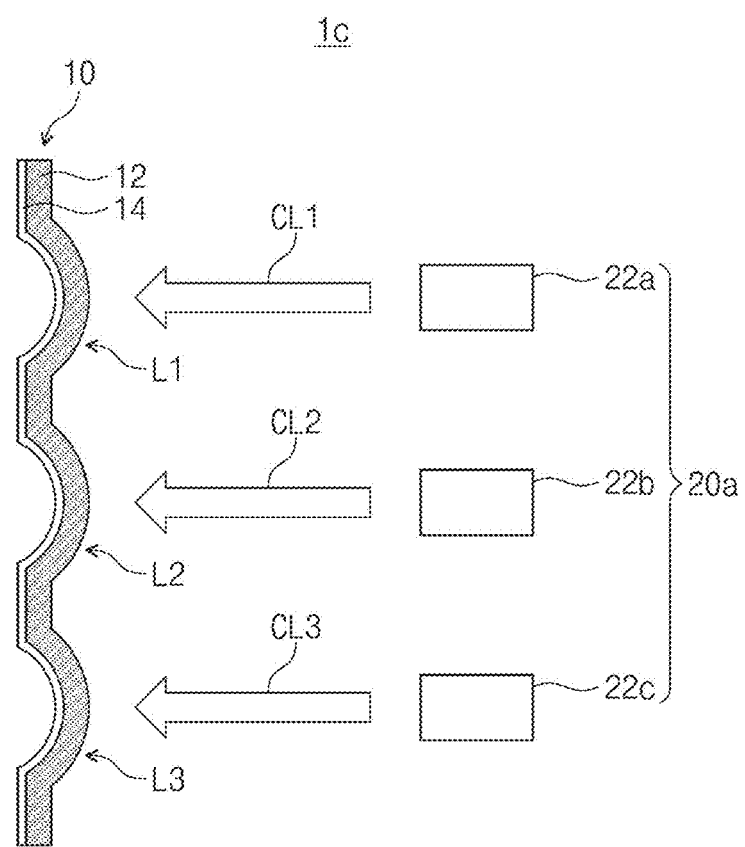
FIGS. 4B and 4C are views showing a process of operating the focal variable device system of FIG. 4A.
Figure 4C:
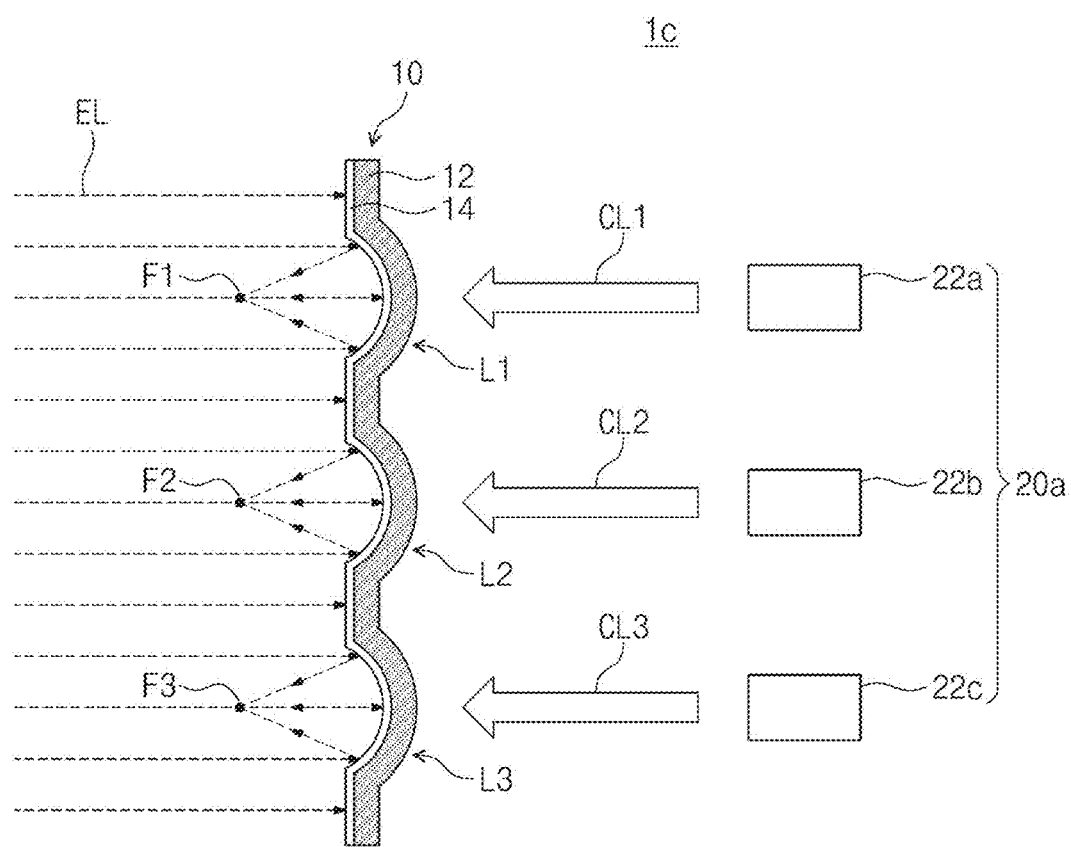
Figure 4D:
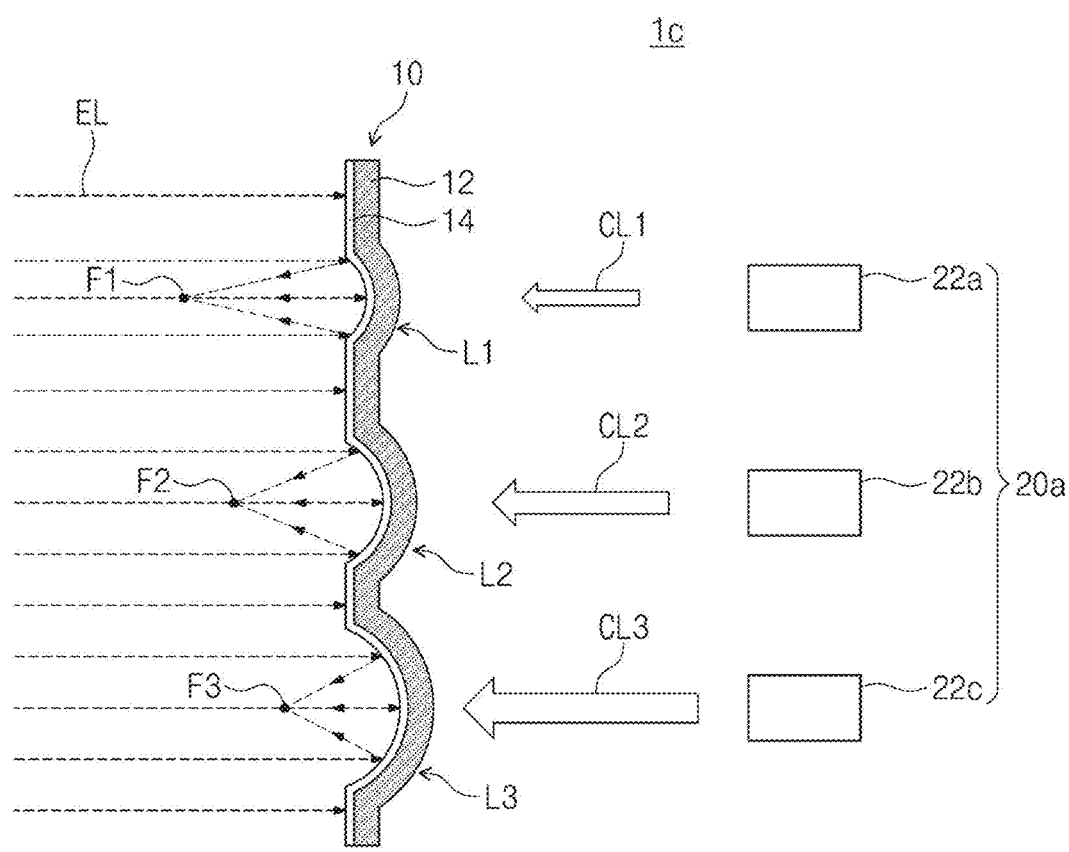
FIG. 4D is a view showing a process of operating the focal variable device system of FIG. 4A.

FIG. 4A is a view showing a focal variable device system 1c according to an embodiment of the inventive concept. FIGS. 4B and 4C are views showing a process of operating the focal variable device system 1c of FIG. 4A. FIG. 4D is a view showing a process of operating the focal variable device system 1c of FIG. 4A. Hereinafter, the focal variable device system 1c according to an embodiment of the inventive concept will be described with reference to FIGS. 4A to 4D. Configurations that are substantially the same as or similar to those of the focal variable device system 1 described above with reference to FIGS. 1A to 1C are denoted by the same reference numerals, and redundant description thereof will be omitted.

The adjustable light source unit 20a of FIG. 4A may include a plurality of adjustable light sources 22a, 22b, and 22c. For example, the adjustable light source unit 20a may include a first adjustable light source 22a, a second adjustable light source 22b, and a third adjustable light source 22c. Although the drawing shows that the adjustable light source unit 20a includes three adjustable light sources 22a, 22b and 22c as an example, this is only an example and is not limited thereto.

Referring to FIGS. 4B and 4C, the first adjustable light source 22a may cause the first adjustable light CL1 to enter the first position L1 of the focus variable element 10. The second adjustable light source 22b may cause the second adjustable light CL2 to enter the second position L2 of the focus variable element 10. The third adjustable light source 22c may cause the third adjustable light CL3 to enter the third position L3 of the focus variable element 10. The first to third adjustable light sources 22a, 22b, and 22c may be pulse lasers, for example. The controller 30 may control the first to third adjustable light sources 22a, 22b, and 22c, respectively. For example, the controller 30 may control the intensities and/or shapes of the first to third adjustable light sources 22a, 22b, and 22c, respectively.

As the first to third adjustable lights CL1, CL2, and CL3 are incident, the shape of the focus variable element 10 may change. For example, since the curvature change rate of the absorbing layer 12 is greater than the curvature change rate of the reflective layer 14, the absorbing layer 12 is expanded than the reflective layer 14 so that the absorbing layer 12 may be convex in the direction toward the adjustable light source 20 in the plane (for example, the plane on which the absorbing layer 12 is placed before the adjustable light is applied) of the absorbing layer 12. Since the controller 30 controls the first to third adjustable light sources 22a, 22b, and 22c such that the first to third adjustable lights CL1, CL2, and CL3 have the same intensity and shape each other, curvature change rates of the first to third positions L1, L2, and L3 of the focus variable element 10 may be the same. Accordingly, focal points F1, F2, and F3 where the external light EL reflected at the first to third positions L1, L2, and L3 is focused may be formed to have the same focal point distance from each other. In the present specification, the focal point distance may mean a straight distance between the focal point F and the focus variable element 10.

Unlike this, referring to FIG. 4D, the controller 30 may control the first to third adjustable light sources 22a, 22b, and 22c so that the first to third adjustable lights CL1, CL2, and CL3 have different intensities. For example, the intensity of the second adjustable light CL2 may be greater than the intensity of the first adjustable light CL1, and the intensity of the third adjustable light CL3 may be greater than the intensity of the second adjustable light CL2. Accordingly, the curvature change rate of the second position L2 may be greater than the curvature change rate of the first position L1, and the curvature change rate of the third position L3 may be greater than the curvature change rate of the second position L2. That is, the convexity at the second position L2 may be greater than the convexity at the first position L1, and the convexity at the third position L3 may be greater than the convexity at the second position L2. Due to this, the focal point F1 at which the external light EL reflected at the first position L1 may have a farther focal point distance than the focal point F2 at which the external light EL reflected at the second position L2 is focused. The focal point F2 at which the external light EL reflected at the second position L2 is focused may have a farther focal point than the focal point F3 at which the external light EL reflected at the third position L3 is focused.

As described above, the focus variable element 10 may function as a focus variable mirror array.

According to embodiments of the invention, the focus variable element of the focal variable device system absorbs light and thermally expands so that the shape may vary. The focal variable device system according to the inventive concept may not require a separate physical and/or electrical driver. Accordingly, the focal variable device system of a simpler structure can be implemented, remote driving can be possible, and various types of focal variable device system can be implemented.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A focal variable device system comprising:
a focus variable element comprising an absorbing layer; and
an adjustable light source configured to cause an adjustable light to enter the focus variable element,
wherein the absorbing layer comprises a thermal expansion material that absorbs the adjustable light and thermally expands,
wherein the focus variable element further comprises a reflective layer and a middle layer disposed between the absorbing layer and the reflective layer,
wherein the absorbing layer has a first thermal expansion coefficient,
wherein the reflective layer has a second thermal expansion coefficient different from the first thermal expansion coefficient.

2. The focal variable device system of claim 1,
wherein the absorbing layer has a first absorption rate for the adjustable light,
wherein the reflective layer has a second absorption rate that is different from the first absorption rate for the adjustable light.

3. The focal variable device system of claim 2, wherein the first absorption rate is greater than the second absorption rate.

4. The focal variable device system of claim 1, wherein the first thermal expansion coefficient is greater than the second thermal expansion coefficient.

5. The focal variable device system of claim 4, wherein the first thermal expansion coefficient is 10 times or more than the second thermal expansion coefficient.

6. The focal variable device system of claim 1, wherein a thickness of the absorbing layer is thicker than a thickness of the reflective layer.

7. The focal variable device system of claim 1, wherein the middle layer has a third thermal expansion coefficient that is greater than the first thermal expansion coefficient.

8. The focal variable device system of claim 1, wherein the middle layer has a third thermal expansion coefficient,
wherein the third thermal expansion coefficient is less than the first thermal expansion coefficient and greater than the second thermal expansion coefficient.

9. The focal variable device system of claim 1, wherein the absorbing layer includes a polymer,
wherein the reflective layer includes a metal, a dielectric material, and/or a polymer.

10. The focal variable device system of claim 9, wherein the absorbing layer includes at least one of polyamide, polyester, polysiloxane, polyurethane, polyimide, polyether, polycarbonate, or acrylic polymer.

11. The focal variable device system of claim 1, wherein the absorbing layer comprises an absorbing pattern having a diameter which is equal to or smaller than a wavelength of the adjustable light.

12. A focal variable device system comprising:
a focus variable element comprising an absorbing layer with a thermal expansion material; and
an adjustable light source configured to cause an adjustable light that adjusts a thermal expansion of the absorbing layer to enter the focus variable element,
wherein the adjustable light source comprises:
a first adjustable light source configured to cause a first adjustable light to enter the focus variable element; and
a second adjustable light source configured to cause a second adjustable light to enter the focus variable element,
wherein the focus variable element further comprises a reflective layer and a middle layer disposed between the absorbing layer and the reflective layer,
wherein the absorbing layer has a first thermal expansion coefficient,
wherein the reflective layer has a second thermal expansion coefficient that is less than the first thermal expansion coefficient.

13. The focal variable device system of claim 12, wherein the focal variable device system further comprises a controller for controlling the adjustable light source,
wherein the first adjustable light source causes the first adjustable light to enter a first position of the focus variable element,
wherein the second adjustable light source causes the second adjustable light to enter a second position of the focus variable element,
wherein the controller controls the first adjustable light source and the second adjustable light source to adjust an intensity of the first adjustable light and the second adjustable light.

14. The focal variable device system of claim 12, wherein the focal variable device system further comprises a controller for controlling the adjustable light source,
wherein the first adjustable light source causes the first adjustable light to enter a first position of the focus variable element,
wherein the second adjustable light source causes the second adjustable light to enter a second position of the focus variable element,
wherein the controller controls the first adjustable light source and the second adjustable light source to adjust a shape of the first adjustable light and the second adjustable light.

15. A focal variable device system comprising:
a focus variable element comprising an absorbing layer; and an adjustable light source configured to cause an adjustable light to enter the focus variable element,
wherein the absorbing layer comprises a thermal expansion material that absorbs the adjustable light and thermally expands, and
wherein the focus variable element further comprises:
a lens part;
a middle layer between the absorbing layer and the lens part; and
a supporting part configured to accommodate the absorbing layer, the middle layer, the lens part.

* * * * *